United States Patent Office 3,161,691
Patented Dec. 15, 1964

3,161,691
PREPARATION OF 1-ALKYLCYCLOHEXENES
Jerome A. Vesely, Park Ridge, Ill., assignor to Universal Oil Products Company, Des Plaines, Ill., a corporation of Delaware
No Drawing. Filed Nov. 23, 1960, Ser. No. 71,134
15 Claims. (Cl. 260—666)

This invention relates to a process for the preparation of 1-alkylcyclohexenes and in particular the preparation of 1-methylcyclohexene.

In general, the products of the present process are useful as chemical intermediates. In particular, 1-methylcyclohexene, in a substantially pure form, is useful as a chemical intermediate for the pyrolytic production of isoprene, isoprene being of prime importance in the manufacture of synthetic rubber.

The dehydration of 2-methylcyclohexanol would appear to be a logical method for the preparation of the desired 1-methylcyclohexene isomer of methylcyclohexene. However, when 2-methylcyclohexanol is dehydrated in the presence of conventional dehydration catalysts the product comprises a mixture of the three isomeric forms of methylcyclohexene.

It is an object of this invention to present a novel process for the preparation of 1-alkylcyclohexenes.

It is a further object to present a novel process for the preparation of 1-methylcyclohexene.

A more specific object is in a process for the preparation of 1-methylcyclohexene by the dehydration of 2-methylcyclohexanol in a manner whereby 1-methylcyclohexene is formed to the substantially complete exclusion of the remaining isomeric forms of methylcyclohexene.

One embodiment of this invention is in a process for the preparation of a 1-alkylcyclohexene by the catalytic dehydration of a 2-alkylcyclohexanol which comprises contacting the 2-alkylcyclohexanol with a catalyst at dehydration reaction conditions, said catalyst comprising a complex of a boron trihalide and a metal halide selected from the group consisting of iron halides, cobalt halides, chromium halides, manganese halides, vanadium halides, and zirconium halides.

Another embodiment is in a process for the preparation of a 1-alkylcyclohexene by the catalytic dehydration of a 2-alkylcyclohexanol which comprises contacting the 2-alkylcyclohexanol with a catalyst at dehydration reaction conditions, said catalyst comprising a complex of boron trifluoride and a metal fluoride selected from the group consisting of iron fluorides, cobalt fluorides, chromium fluorides, manganese fluorides, vanadium fluorides, and zirconium fluorides.

A further embodiment is in a process for the preparation of a 1-alkylcyclohexene by the catalytic dehydration of a 2-alkylcyclohexanol which comprises contacting the 2-alkylcyclohexanol with a catalyst at dehydration reaction conditions, said catalyst comprising a complex of boron trifluoride and ferrous fluoride.

A more specific embodiment is in a process for the preparation of 1-methylcyclohexene by the catalytic dehydration of 2-methylcyclohexanol which comprises contacting the 2-methylcyclohexanol with a catalyst at a temperature of from about 75° C. to about 150° C., said catalyst comprising a complex of boron trifluoride and ferrous fluoride.

Further objects and embodiments relating to the process of the present invention will become apparent in the following detailed description thereof.

In accordance with the process of the present invention a 1-alkylcyclohexene is prepared by the catalytic dehydration of a 2-alkylcyclohexanol. The 1-alkylcyclohexenes which can be prepared by this process include 1-methylcyclohexene, 1-ethylcyclohexene, 1-propylcyclohexene, 1-isopropylcyclohexene, 1-butylcyclohexene, 1-tert-butylcyclohexene, 1-amylcyclohexene, 1-isoamylcyclohexene, etc. The 2-alkylcyclohexanols which can be utilized for the preparation of the 1-alkylcyclohexenes, such as are included in the above description, are those wherein the alkyl group corresponds to the alkyl group of the desired 1-alkylcyclohexene and thus include, for example, 2-methylcyclohexanol for the preparation of 1-methylcyclohexene, 2-ethylcyclohexanol for the preparation of 1-ethylcyclohexene, 2-propylcyclohexanol for the preparation of 1-propylcyclohexene, and so forth.

In a preferred embodiment of this invention 2-methylcyclohexanol is dehydrated at dehydration reaction conditions in the presence of a dehydration catalyst to yield 1-methylcyclohexene.

The dehydration catalysts of this invention comprise a complex of a boron trihalide and a metal halide which may be a halide of iron, cobalt, chromium, manganese, vanadium, or zirconium. The boron trihalide is preferably boron trifluoride. It is further preferred that the metal halide be a metal fluoride thus including iron fluorides, cobalt fluorides, chromium fluorides, manganese fluorides, vanadium fluorides, and zirconium fluorides. In general, the metal fluorides, the metal components of which are in the lower valence state, appear to form a more effective catalyst and are preferred. Chromous fluoride, cobaltous fluoride, and manganous fluoride are among the more effective metal fluorides although they are not necessarily equivalent to ferrous fluoride which is preferred.

The preferred catalyst composition for the dehydration of the 2-alkylcyclohexanols comprises a complex of boron trifluoride and ferrous fluoride. This complex analyzes $FeF_5B$ and is believed to be of the formula $FeF_2 \cdot BF_3$. However, the catalyst complex may also contain two, or possibly more, $BF_3$ constituents complexed with the ferrous fluoride.

The above described complex may be formed in any suitable manner. In one method, hydrogen fluoride is reacted with iron to form ferrous fluoride and the latter is then reacted with boron trifluoride to form the desired complex. In another method, hydrogen fluoride and boron trifluoride are contacted simultaneously with iron. In preparing the complex it is necessary that hydrogen fluoride be present during the addition of the boron trifluoride. Therefore, when the hydrogen fluoride is added first, and then the boron trifluoride, sufficient hydrogen fluoride should be present in the system in order to effect the formation of the desired complex. The iron to be thus treated is preferably in the finely divided state and can be powdered iron.

While the catalyst complex is generally prepared in an anhydrous form it is not necessary that it remain so. The catalyst complex of this invention functions effectively in the hydrated form and in the presence of water such as is formed in the present dehydration reaction. In fact, it is considered that the presence of water permits the utilization of the catalyst complex at reaction temperatures which would otherwise act to drive off the $BF_3$ portion of the catalyst complex. For example, the anhydrous complex of boron trifluoride and ferrous fluoride is stable at ordinary temperatures and pressures. However, it looses boron trifluoride when heated, gradually at first, and substantially at about 50° C. When the catalyst complex is prepared in the hydrated form it remains stable even under dehydration reaction conditions as hereinafter set forth.

The dehydration reaction conditions employed in the present process are primarily concerned with reaction temperatures. Pressure is not an important variable and may be simply atmospheric or autogenous pressure. A reaction temperature of from about 75° C. to about 150°

C. is operable. However, when operating in a continuous manner wherein the products are continuously being recovered from the reaction mixture by distillation methods as will hereinafter be described, it is preferable to operate at a temperature of from about 110° C. to about 150° C. to facilitate the azeotropic distillation of the products.

The process of this invention can be effected in any suitable manner and is adapted to a batch type as well as a continuous type of operation. For example, when it is desired to utilize a batch type of operation the catalyst complex and the 2-methylcyclohexanol are contacted, by stirring or otherwise, in a suitable reaction vessel at a temperature of from about 75° C. to about 150° C. After a pre-determined period of time, sufficient to insure complete conversion of the 2-methylcyclohexanol, the reaction vessel contents are cooled to about room temperature. As the water forms during the course of the dehydration reaction, the catalyst phase assumes a paste-like, or sludge-like character which becomes further diluted as the reaction progresses. After the catalyst phase settles out, the upper layer, comprising the 1-methylcyclohexene and any unreacted 2-methylcyclohexanol, is decanted or otherwise separated therefrom. The catalyst phase is recovered for further utilization. Although it does not appear that the catalyst complex is adversely effected by dilution with the water resulting from the dehydration reaction, it is desirable to separate the water of dehydration from the catalyst phase prior to re-use. This can be readily accomplished by simple distillation or by evaporation, preferably over steam.

The present process can be operated in a continuous manner by providing means for the continuous addition of the 1-methylcyclohexanol and for the continuous removal of the reaction products from the reaction vessel. The latter can be accomplished by including a short fractionating column leading to a condenser such that the reaction products will continuously distill overhead from the reaction vessel to be condensed and recovered. In a continuous process wherein the reaction products are so recovered it is desirable to maintain the reaction temperature at from about 110° C. to about 150° C. The products of the reaction comprise water and 1-methylcyclohexene. The 1-methylcyclohexene can be decanted or otherwise separated from the immiscible water layer. The rate at which this water of dehydration is recovered will determine the rate at which the 2-methylcyclohexanol is added to the reaction vessel. Any unreacted 2-methylcyclohexanol can be readily separated from the 1-methylcyclohexene product, as by distillation, and recycled to the reaction vessel.

The following examples are presented to further illustrate the process of this invention, and it is not intended to unduly limit the generally broad scope of this invention in strict accordance with said examples.

*Example I*

A ferrous fluoride-boron trifluoride catalyst complex was prepared by placing 28 grams of iron powder and 88 grams of anhydrous hydrogen fluoride in a copper lined steel autoclave. The autoclave was heated to a temperature of about 100° C. and rotated for a period of about 3 hours. Thereafter, the autoclave was allowed to cool and the hydrogen which formed during the course of the reaction was vented to the atmosphere. Boron trifluoride (61 grams) was then pressured into the autoclave and the autoclave rotated for a period of about 20 hours at a temperature of about 23° C. The catalyst complex, comprising approximately 82 grams of a white, very hygroscopic solid, was recovered from the autoclave. The $FeF_2 \cdot BF_3$ thus prepared was subsequently made into an aqueous solution, filtered, and evaporated to dryness over steam to yield the hydrated form

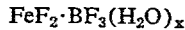

$$FeF_2 \cdot BF_3(H_2O)_x$$

57 grams of 2-methylcyclohexanol and 20 grams of $FeF_2 \cdot BF_3(H_2O)_x$ were charged to a 100 cc. distillation flask provided with a short fractionating column leading to a water cooled condenser. A receiver, adapted to provide a measure of the distillate, was attached to the condenser. Heat was applied to the distillation flask and as the temperature of the contents approached 120° C. a mixture, comprising the reaction products, started to distill from the distillation flask. As the distillate was condensed and recovered in the receiver, the temperature of the flask contents continued to rise to a temperature of about 140° C. The distillate recovered during this period included a water phase and about 30 grams of a water insoluble phase. The water insoluble phase was decanted and dried over potassium carbonate. This dried product was analyzed by infrared analysis and found to contain 95% 1-methylcyclohexene and 5% unreacted 2-methylcyclohexanol.

*Example II*

To further illustrate the advantages of this invention relating to the ability of the catalyst to function in an aqueous media inherent in dehydration reactions, and also the simple manner-in which the catalyst is regenerated, approximately 57 grams of 2-methylcyclohexanol and 20 grams of $FeF_2 \cdot BF_3(H_2O)_x$ in a 100 cc. distillation flask, equipped with an overhead water cooled condenser and a stirring mechanism, are heated to a temperature of about 115° C. to set up a moderate rate of reflux in the overhead condenser. After a reaction period of about 30 minutes the flask contents are cooled to about room temperature. After the catalyst phase settles out the upper liquid layer is decanted therefrom, dried over potassium carbonate, and 1-methylcyclohexene recovered in a substantially pure state. The catalyst phase, containing the water formed by the dehydration reaction, is evaporated to dryness over steam. The water content of the catalyst phase, resulting from the dehydration reaction, is thus evaporated from the catalyst complex. The catalyst complex, comprising a hydrated ferrous fluoride-boron trifluoride complex, is recovered for further use.

I claim as my invention:

1. A process for the preparation of a 1-alkylcyclohexene by the catalytic dehydration of a 2-alkylcyclohexanol which comprises contacting the 2-alkylcyclohexanol at dehydration reaction conditions with a complex of a boron trihalide and a metal halide selected from the group consisting of iron halides, cobalt halides, chromium halides, manganese halides, vanadium halides and zirconium halides to produce said 1-alkylcyclohexene substantially free of other isomeric forms of alkylcyclohexane.

2. A process for the preparation of 1-alkylcyclohexene by the catalytic dehydration of a 2-alkylcyclohexanol which comprises contacting the 2-alkylcyclohexanol at dehydration reaction conditions with a complex of boron trifluoride and metal fluoride selected from the group consisting of iron fluorides, cobalt fluorides, chromium fluorides, manganese fluorides, vanadium fluorides and zirconium fluorides to produce said 1-alkylcyclohexene substantially free of other isomeric forms of alkylcyclohexene.

3. A process for the preparation of 1-alkylcyclohexene by the catalytic dehydration of a 2-alkylcyclohexanol which comprises contacting the 2-alkylcyclohexanol at dehydration reaction conditions with a complex of boron trifluoride and ferrous fluoride to produce said 1-alkylcyclohexene substantially free of other isomeric forms of alkylcyclohexene.

4. A process for the preparation of 1-alkylcyclohexene by the catalytic dehydration of a 2-alkylcyclohexanol which comprises contacting the 2-alkylcyclohexanol at dehydration reaction conditions, with a complex of boron trifluoride and cobaltous fluoride to produce said 1-alkylcyclohexene substantially free of other isomeric forms of alkylcyclohexane.

5. A process for the preparation of 1-alkylcyclohexene by the catalytic dehydration of a 2-alkylcyclohexanol which comprises contacting the 2-alkylcyclohexanol at dehydration reaction conditions with a complex of boron trifluoride and manganous fluoride to produce said 1-alkylcyclohexene substantially free of other isomeric forms of alkylcyclohexene.

6. A process for the preparation of 1-alkylcyclohexene by the catalytic dehydration of a 2-alkylcyclohexanol which comprises contacting the 2-alkylcyclohexanol at dehydration reaction conditions with a complex of boron trifluoride and chromous fluoride to produce said 1-alkylcyclohexene substantially free of other isomeric forms of alkylcyclohexene.

7. A process for the preparation of a 1-alkylcyclohexene by the catalytic dehydration of a 2-alkylcyclohexanol which comprises contacting the 2-alkylcyclohexanol at a temperature of from about 75° C. to about 150° C. with a complex of boron trifluoride and ferrous fluoride to produce said 1-alkylcyclohexene substantially free of other isomeric forms of alkylcyclohexene.

8. A process for the preparation of 1-alkylcyclohexene by the catalytic dehydration of 2-alkyl cyclohexanol which comprises contacting the 2-alkylcyclohexanol at a temperature of from about 75° C. to about 150° C. with a complex of boron trifluoride and cobaltous fluoride to produce said 1-alkylcyclohexene substantially free of other isomeric forms of alkylcyclohexene.

9. A process for the preparation of 1-alkylcyclohexene by the catalytic dehydration of 2-alkylcyclohexanol which comprises contacting the 2-alkylcyclohexanol at a temperature of from about 75° C. to about 150° C. with a complex of boron trifluoride and manganous fluoride to produce said 1-alkylcyclohexene substantially free of other isomeric forms of alkylcyclohexene.

10. A process for the preparation of 1-alkylcyclohexene by the catalytic dehydration of 2-alkylcyclohexanol which comprises contacting the 2-alkylcyclohexanol at a temperature of from about 75° C. to about 150° C. with a complex of boron trifluoride and chromous fluoride to produce said 1-alkylcyclohexene substantially free of other isomeric forms of alkylcyclohexene.

11. A process for the preparation of 1-methylcyclohexene by the catalytic dehydration of 2-methylcyclohexanol which comprises contacting the 2-methylcyclohexanol at a temperature of from about 75° C. to about 150° C. with a complex of boron trifluoride and ferrous fluoride to produce said 1-methylcyclohexene substantially free of other isomeric forms of methylcyclohexene.

12. A process for the preparation of 1-methylcyclohexene by the catalytic dehydration of 2-methylcyclohexanol which comprises contacting the 2-methylcyclohexanol at a temperature of from about 75° C. to about 150° C. with a complex of boron trifluoride and cobaltous fluoride to produce said 1-methylcyclohexene substantially free of other isomeric forms of methylcyclohexene.

13. A process for the preparation of 1-methylcyclohexene by the catalytic dehydration of 2-methylcyclohexanol which comprises contacting the 2-methylcyclohexanol at a temperature of from about 75° C. to about 150° C. with a complex of boron trifluoride and manganous fluoride to produce said 1-methylcyclohexene substantially free of other isomeric forms of methylcyclohexene.

14. A process for the preparation of 1-methylcyclohexene by the catalytic dehydration of 2-methylcyclohexanol which comprises contacting the 2-methylcyclohexanol at a temperature of from about 75° C. to about 150° C. with a complex of boron trifluoride and chromous fluoride to produce said 1-methylcyclohexene substantially free of other isomeric forms of methylcyclohexene.

15. The process of claim 1 further characterized in that said 2-alkylcyclohexanol is 2-methylcyclohexanol which is dehydrated to 1-methylcyclohexene substantially unadmixed with other isomeric forms of methylcyclohexene.

References Cited in the file of this patent
UNITED STATES PATENTS

| 2,478,270 | Ipatieff et al. | Aug. 9, 1949 |
| 2,678,338 | Linn | May 11, 1954 |

FOREIGN PATENTS

| 458,136 | Canada | July 12, 1949 |

OTHER REFERENCES

Booth et al.: Boron Trifluoride and its Derivatives, John Wiley & Sons, Inc., New York (1949) (page 195 relied upon).

Boron Fluoride and its Compounds as Catalysts in Organic Chemistry, by Topchev et al., vol. 2, p. 267 relied on, Pergamon Press, New York, 1959.